NEUTRAL TO NEUTRAL OR POLAR TO POLAR SOLID STATE RELAY
DERIVING ALL ITS POWER FROM THE INPUT SIGNALS
Filed March 27, 1962
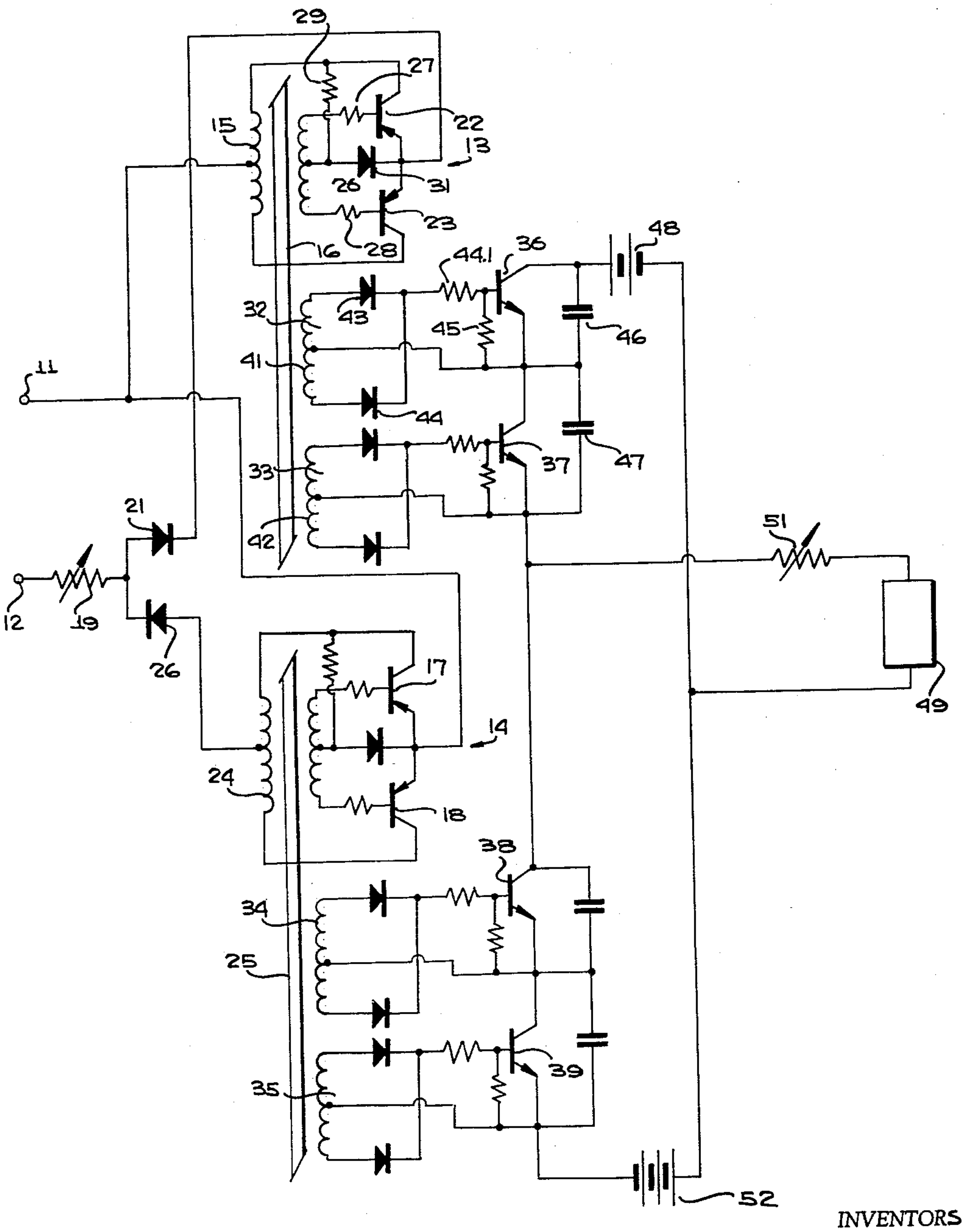
INVENTORS
RICHARD A. CAUBLE
& THOMAS A. PICKERING
BY Hurwitz & Rose
ATTORNEYS 3,148,286

NEUTRAL TO NEUTRAL OR POLAR TO POLAR SOLID STATE RELAY DERIVING ALL ITS POWER FROM THE INPUT SIGNALS

Thomas A. Pickering, Winter Park, and Richard E. Cauble, Orlando, Fla., assignors to Radiation Incorporated, Melbourne, Fla., a corporation of Florida Filed Mar. 27, 1962, Ser. No. 182,834
11 Claims. (Cl. 307—88.5)

The present invention relates generally to a solid state relay circuit and more particularly to a solid state circuit for connecting potentials of either polarity selectively to a load, wherein the circuit derives its operating power from only external sources.

Presently, electromechanical relays are utilized in telegraph or Teletype circuitry for repeating signals and for deriving signals for control of output equipment. Electromechanical relay systems have not proven completely desirable because of reliability, maintenance and adjustment problems associated therewith. Also prior relay devices are incapable of operating at high speeds without inherent bias distortion.

Attempts in the past to provide all electronic, solid state relay or repeater devices have necessitated the utilization of an internal power supply. Utilization of such supplies is not desirable because of the space they occupy, heating factors, noise contribution and the possibility of part replacement.

The present invention provides a completely solid state electronic repeater unit which regenerates degraded pulse signals which may be derived in either a neutral to neutral or polar to polar system, without the need for an internal power supply. This is accomplished by employing a pair of switching circuits, each with an oscillator circuit having its power supplied directly from the line signals. One oscillator is activated into oscillation when the signals on the line are of one polarity and the other oscillator is activated when the line signals are of the opposite polarity. The output of each oscillator is inductively coupled through a separate full wave rectifier to a separate switching circuit.

One switching circuit includes a transistor for connecting an external, D.C. potential of one polarity to an external load. Across the transistor in the switching circuit is a capacitor to prevent spurious pulses from damaging the transistor. A pair of transistors is series connected in each of the switches to prevent possible breakdown of the transistors due to too large an external potential being applied thereacross. The other switching circuit connects a D.C. potential of opposite polarity to the first potential to the external load when the second oscillator is activated in response to input signals of opposite polarity to that which activate the first oscillator.

When the system is connected to a telegraph line wherein zeros are represented by zero voltage and ones are represented by a voltage of a particular polarity, only one oscillator is activated. This oscillator is activated in response to the potential applied across the system input terminals and causes the load to be supplied with current in a predetermined direction. When a zero signal is applied to the input terminal, no current is applied to the external load, resulting in a zero output being derived therefrom.

When the system is utilized as a polar to polar circuit, signals of one polarity activate one of the oscillators to cause current to flow in one direction through the external load while signals of the opposite polarity activate the other oscillator to cause current to flow through the load in the opposite direction than when the first oscillator is activated. Thus the system is easily adapted to be utilized as a neutral to neutral or polar to polar solid state element.

It is accordingly an object of the present invention to provide a new and improved neutral to neutral or polar to polar solid state relay wherein all power is supplied to the circuit from external sources.

It is another object of the present invention to provide a new and improved switching circuit which derives its input power only from signals applied thereto externally.

A further object of the present invention is to provide a new and improved switching circuit having the attributes of an electromechanical relay but which is more reliable than the electromechanical relay and which does not require the maintenance or adjustment associated therewith.

Still another object of the present invention is to provide a solid state circuit which functions as an electromechanical relay but at considerably higher speeds with less inherent bias distortion than an electromechanical relay.

It is still another object of the present invention to provide a new and improved solid state switching circuit for reconstituting degraded pulses into sharply defined pulses, which circuit employs an oscillator having its power supplied to it only by the degraded pulses.

The above and still further objects, features and advantages of the present invention will become apparent upon consideration of the following detailed description of one specific embodiment thereof, especially when taken in conjunction with the accompanying drawings, wherein:

The sole figure is a schematic diagram of the neutral to neutral or polar to polar solid state relay circuit of the present invention.

Referring now to the figure, there is disclosed a circuit having a pair of input terminals 11 and 12 adapted to be connected to a telegraph or teletype line. Terminals 11 and 12 are connected to apply power from the telegraph line to oscillators 13 and 14. Terminal 11 is connected to the center tap of the primary winding 15 of transformer 16, included in the circuit of oscillator 13. Terminal 11 is also connected to the junction between the emitters of transistors 17 and 18 of oscillator 14. Terminal 12 is connected through variable, current control resistor 19 and diode 21 to the common junction between the emitters of transistors 22 and 23 of oscillator 13. Terminal 12 is also connected to the center tap of primary winding 24 of transformer 25 via diode 26 and resistor 19.

Oscillators 13 and 14 are of the relaxation type employing transformers 16 and 25, respectively having magnetic cores with rectangular hysteresis loops. Since these oscillators are substantially identical, a description of one will suffice for both. The bases of transistors 22 and 23 are connected to the opposite ends of the secondary winding 26 of transformer 16 via current limiting resistors 27 and 28, respectively. Connected between the collector of transistor 22 and the center tap of secondary winding 26 is a current limiting and starting resistor 29. Diode 31 is connected between the center tap of secondary winding 26 and the common junction of the emitters of transistors 22 and 23 to insure oscillator starting and provide a low impedance path during periods of oscillation.

The oscillations established by oscillators 13 and 14, respectively, are coupled by means of the magnetic cores of transformers 16 and 25, respectively to a pair of full wave rectifiers 32, 33 and 34, 35, respectively. Rectifying circuits 32 and 33 are coupled to transistor switches 36 and 37, respectively and rectifiers 34 and 35 are coupled to transistor switches 38 and 39, respectively.

Since the rectifier and transistor switching circuits for each oscillator are identical, a description of one suffices for the other. Rectifiers 32 and 33 include secondary windings 41 and 42, respectively, of transformer 16. At opposite ends of winding 41 are rectifying diodes 43 and 44, these diodes being poled in the same direction. The cathodes of diodes 43 and 44 are connected together and to the base of transistor 36 by way of current limiting resistor 44.1. Base reference is established between the base and emitter electrodes of transistor 36 by resistor 45. The emitter of transistor 36 is connected to the center tap of secondary winding 41 and to the collector of transistor 37. The base to emitter circuit of transistor 37 is connected to full wave rectifier 33 through exactly the same circuitry which the base to emitter circuit of transistor 36 is connected to full wave rectifier 32. Connected across the base and collector of transistors 36 and 37 are capacitors 46 and 47. Capacitors 46 and 47 prevent the high frequency pulses which may be spuriously developed across transistors 36 and 37 from being applied to an external circuit, and provide for equal distribution of transient voltages.

The positive terminal of an external D.C. power supply 48 is connected to the collector of transistor 36 and the negative terminal of this supply is connected to the external load 49. The other end of external load 49 is connected through a variable, current regulating resistor 51 to the emitter of transistor 37 and the collector of transistor 38. A further external D.C. supply 52 has its negative terminal connected to the emitter of NPN transistor 39 and its positive terminal connected to the junction of load impedance 49 and the negative terminal of battery 48. Transistors 36 and 37 when activated, provide a series switch for coupling the current derived from battery 48 through load resistor 49 in a first direction. In the opposite manner, transistors 38 and 39 when activated permit current from battery 52 to be supplied through load impedance 49 in the opposite direction from that supplied by battery 48.

The circuit including oscillator 13 functions to regenerate degraded current pulses which are derived in the external telegraph or Teletype line when the potential at terminal 11 is negative with respect to that at terminal 12. Under such circumstances, positive current is applied to activate relaxation oscillator 13 via terminal 12, current regulating resistor 19 and diode 21. Oscillator 14 will not be activated under these circumstances because diode 26 cannot conduct and therefore no current is applied to oscillator 14. When oscillator 13 is activated, it develops relatively high frequency (100 kc.) square wave oscillations which are coupled via the core of transformer 16 to secondary windings 41 and 42. Diodes 43 and 44 are connected at opposite ends of the secondary windings to couple a constant value, positive D.C. voltage to the bases of transistors 36 and 37. This causes the NPN transistors 36 and 37 to be rendered highly conductive to apply current from supply 48 to load 49.

The circuit including oscillator 14, rectifiers 34 and 35, and switching transistors 38 and 39 functions in the same manner as the circuit including oscillator 13 but in response to positive current applied to terminal 11. When the circuit is utilized as a neutral to neutral switching device, the voltage between terminals 11 and 12 varies only between zero and a predetermined polarity. This results in only one of the oscillators 13 or 14 ever being activated and consequently the application of a single polarity or zero voltage to load 49. When zero voltage is applied between terminals 11 and 12, neither oscillator is activated and no current flows through load 49.

In utilization as a polar to polar type relay circuit, both oscillators 13 and 14 are utilized to develop the required positive and negative currents through load 49 as derived by power supplies 48 or 52. This is accomplished in response to the polarity of the signal applied to terminals 11 and 12 as described supra.

While we have described and illustrated one specific embodiment of our invention, it will be clear that variations of the details of construction which are specifically illustrated and described may be resorted to without departing from the true spirit and scope of the invention as defined in the appended claims.

We claim:

1. In a telegraphy receiving apparatus for activating a polar or neutral load of a device external to the apparatus, said load being activated in response to reception of degraded polar or neutral telegraphy pulses, said apparatus requiring no energizing potential external to the supplies of the external device, comprising first and second signal input terminals responsive to said pulses, first and second triggered oscillators having power input terminals, means for triggering said first oscillator into oscillation only when the potential of said first terminal exceeds the potential of said second terminal, means for triggering said second oscillator into oscillation only when the potential of said second terminal exceeds the potential of said first terminal, both of said triggering means including D.C. paths for applying said pulses to the power input terminals of said oscillators, said pulses being the only power supplied to said power input terminals, first and second passive rectifying means respectively responsive to the oscillations deriving from said first and second oscillators, first and second normally open switching means responsive to said first and second rectifying means, respectively, each of said switching means being closed in response to the D.C. voltage derived from the rectifying means to which it is responsive, means for connecting a power supply of one polarity in series circuit with said load and said first switching means, and means for enabling a power supply of the other polarity to be connected in series circuit with said load and said second switching means, said power supplies being part of said external device.

2. The apparatus of claim 1 wherein each of said oscillators is of the relaxation type and includes; a pair of push pull transistors and a magnetic core having a substantially rectangular hysteresis loop, and winding means regeneratively coupling the electrodes of said transistors together via said core; and said triggering means includes a D.C. path from one of said signal input terminals to the collectors of said transistors of one of said oscillators and another D.C. path from the other signal input terminal to the collectors of said transistors of the other of said oscillators, the collectors and emitters of said first oscillator being connected to input terminals reversed from the collectors and emitters of said second oscillator.

3. The apparatus of claim 2 wherein the inputs to said first and second rectifying means are coupled from said first and second oscillators only by the magnetic cores of the respective oscillators.

4. The apparatus of claim 2 wherein the D.C. path between said signal input terminals and power input terminals of each oscillator includes separate diode means, one of said diode means passing said pulses of only one polarity, the other of said diode means passing said pulses of only the other polarity.

5. The apparatus of claim 1 wherein each of said switching means includes a transistor having its base responsive to currents deriving from the rectifying means to which it is responsive, and a capacitor shunting the collector emitter path of said transistor.

6. In a telegraphy receiving apparatus for activating a load of a device external to the apparatus, said load being activated in response to reception of degraded telegraphy pulses, said apparatus requiring no energizing potential external to the supplies of the external device, comprising first and second signal input terminals responsive to said pulses, a triggered oscillator having power input terminals, means for triggering said oscillator into oscillation only when the potential of said first terminal exceeds the potential of the second terminal, said triggering means including a D.C. path for applying said pulses to the power input terminals of said oscillator, said pulses being the only power supplied to said power input terminals, passive rectifying means responsive to the oscillations deriving from said oscillator, normally open switching means responsive to said rectifying means, said switching means being closed in response to the D.C. voltage derived from the rectifying means, and means for connecting a power supply of one polarity in series circuit with said load and said switching means, said power supplies being part of said external device.

7. The apparatus of claim 6 wherein said oscillator is of the relaxation type and includes; a pair of push pull transistors and a magnetic core having a substantially rectangular hysteresis loop, and winding means regeneratively coupling the electrodes of said transistors together via said core; and said triggering means includes a D.C. path from one of said signal input terminals to the collectors of said transistors and another D.C. path from the other signal input terminal to the emitters of said transistors.

8. The apparatus of claim 7 wherein the input to said rectifying means is coupled from said oscillator only by the oscillator magnetic core.

9. The apparatus of claim 7 wherein the D.C. path between said signal input terminals and the power input terminals of said oscillator includes diode means for passing pulses of only one polarity.

10. The apparatus of claim 6 wherein said switching means includes a transistor having its base responsive to currents deriving from the rectifying means and a capacitor shunting the collector emitter path of said transistor.

11. In a telegraphy receiving apparatus for activating a load of a device external to the apparatus, said load being activated in response to reception of degraded telegraphy pulses, said apparatus requiring no energizing potential external to the supplies of the external device, comprising first and second signal input terminals responsive to said pulses, a triggered oscillator having power input terminals, means for triggering said oscillator into oscillation only when the potential of said first terminal exceeds the potential of the second terminal, said triggering means including a D.C. path for applying said pulses to the power input terminals of said oscillator, said pulses being the only power supplied to said power input terminals, normally open switching means, means responsive to said oscillator for closing said switching means throughout the period when said oscillator is oscillating, said switching means being closed in response to the D.C. voltage derived from the rectifying means, and means for connecting a power supply of one polarity in series circuit with said load and said switching means, said power supplies being part of said external device.

References Cited in the file of this patent

UNITED STATES PATENTS

| | | |
|---|---|---|
| 2,851,592 | Webster | Sept. 9, 1958 |
| 2,953,641 | Carver | Sept. 20, 1960 |
| 2,999,170 | Tyler | Sept. 5, 1961 |
| 3,037,078 | Higgins et al. | May 29, 1962 |

OTHER REFERENCES

"Basic Theory and Application of Transistors," Dept. of the Army Technical Manual, TM 11–690, March 1959, page 234 relied on.